United States Patent
Jang

(10) Patent No.: US 8,706,379 B2
(45) Date of Patent: Apr. 22, 2014

(54) SYSTEM AND METHOD FOR CONTROLLING COASTING OF HYBRID VEHICLE EQUIPPED WITH AUTOMATED MANUAL TRANSMISSION

(75) Inventor: Sang Pil Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 297 days.

(21) Appl. No.: 13/323,282

(22) Filed: Dec. 12, 2011

(65) Prior Publication Data

US 2013/0073168 A1   Mar. 21, 2013

(30) Foreign Application Priority Data

Sep. 19, 2011   (KR) .................. 10-2011-0094016

(51) Int. Cl.
*B60W 10/00*   (2006.01)

(52) U.S. Cl.
USPC ............... 701/93; 701/36; 701/51; 701/53; 701/54; 701/67; 701/68; 903/915; 903/930; 903/947; 180/65.21; 180/65.265; 180/65.285

(58) Field of Classification Search
None
See application file for complete search history.

(56) References Cited

U.S. PATENT DOCUMENTS

| | | | | |
|---|---|---|---|---|
| 5,433,512 A * | 7/1995 | Aoki et al. | ............... | 303/3 |
| 5,655,990 A * | 8/1997 | Ooyama et al. | ............... | 477/15 |
| 5,880,574 A * | 3/1999 | Otsuka et al. | ............... | 318/811 |
| 6,070,680 A * | 6/2000 | Oyama | ............... | 180/65.25 |
| 6,484,833 B1 * | 11/2002 | Chhaya et al. | ............... | 180/65.225 |
| 8,296,002 B2 * | 10/2012 | Kumazaki et al. | ............... | 701/22 |
| 2002/0094910 A1 * | 7/2002 | Endo et al. | ............... | 477/97 |
| 2003/0098185 A1 * | 5/2003 | Komeda et al. | ............... | 180/65.2 |
| 2003/0132044 A1 * | 7/2003 | Kitano et al. | ............... | 180/65.2 |
| 2005/0189894 A1 * | 9/2005 | Komiyama et al. | ............... | 318/376 |
| 2007/0102208 A1 * | 5/2007 | Okuda et al. | ............... | 180/65.3 |
| 2008/0224478 A1 * | 9/2008 | Tamor | ............... | 290/40 C |
| 2009/0112386 A1 * | 4/2009 | Saitoh et al. | ............... | 701/22 |
| 2010/0125019 A1 * | 5/2010 | Tabata et al. | ............... | 477/3 |
| 2010/0175944 A1 * | 7/2010 | Hayashi | ............... | 180/242 |
| 2011/0165992 A1 * | 7/2011 | Ueno et al. | ............... | 477/9 |
| 2011/0174559 A1 * | 7/2011 | Saito et al. | ............... | 180/65.27 |
| 2012/0139329 A1 * | 6/2012 | Fabini et al. | ............... | 303/3 |

FOREIGN PATENT DOCUMENTS

JP   05191904 A   7/1993
JP   2010268617 A   11/2010

* cited by examiner

*Primary Examiner* — Jonathan M Dager
(74) *Attorney, Agent, or Firm* — Edwards Wildman Palmer LLP; Peter F. Corless

(57) ABSTRACT

A technique for controlling coasting of a hybrid vehicle equipped with an Automated Manual Transmission (AMT) is disclosed herein. First, the amount of regenerative braking is varied based on the degree of manipulation of an accelerator pedal within the predetermined control range of a total degree of manipulation of the accelerator pedal from when the accelerator pedal is not being manipulated. The amount of regenerative braking decreases as the degree of manipulation of the accelerator pedal increases. The control range is used to perform control in such a way as to vary the amount of regenerative braking according to the amount of manipulation of the accelerator pedal. Further, the control range is set to within a range of initial 5 to 20% of the total degree of manipulation of the accelerator pedal.

7 Claims, 3 Drawing Sheets

SYSTEM AND METHOD FOR CONTROLLING COASTING OF HYBRID VEHICLE EQUIPPED WITH AUTOMATED MANUAL TRANSMISSION

CROSS-REFERENCE TO RELATED APPLICATION

This application claims under 35 U.S.C. §119(a) the benefit of Korean Patent Application No. 10-2011-0094016 filed on Sep. 19, 2011 the entire contents of which are incorporated herein by reference.

BACKGROUND OF THE INVENTION

1. Field of the Invention

The present invention relates generally to a system and method for controlling coasting of a hybrid vehicle equipped with an Automated Manual Transmission (AMT), and, more particularly, to a technology for controlling the amount of regenerative braking when a vehicle is coasting.

2. Description of the Related Art

The power system of a hybrid vehicle equipped with an AMT according to the present invention is made up of an engine, a clutch, a motor, and an AMT, and is configured such that the speed transmission of the AMT is realized when a clutch is released, and that both the power of the engine and the power of the motor are supplied to the input shaft of the AMT when the clutch is engaged.

Hybrid vehicles generally improve energy efficiency by collecting the drive inertia of the vehicle using a regenerative braking function. This regenerative braking function is required to be properly harmonized with the coasting properties of a vehicle. That is, it is necessary to increase the distance of coasting by reducing the amount of regenerative braking when a driver wishes to allow the vehicle to coast and it is necessary to increase the amount of energy recovery by increasing the amount of regenerative braking when coasting is not greatly necessary.

In order to adjust the above-described coasting properties and the regenerative braking function, certain systems and methods of interlocking the degree of manipulation of a brake pedal, operated by a driver, with the amount of regenerative braking have been developed. However, these techniques can be used only in a system capable of obtaining information about the degree of manipulation of a brake pedal. In a system which can only confirm whether a brake pedal is operated or not, it is difficult to adjust the coasting properties and the regenerative braking function based on the degree of manipulation of a brake pedal.

Furthermore, it is difficult to obtain the above-described information about the degree of manipulation of a brake pedal in large-sized commercial vehicles, so that such a vehicle uses a conventional method shown in FIG. 1 to realize the regenerative braking function. That is, when a driver's foot is taken off an accelerator pedal and the value of an accelerator pedal sensor is not greater than 0, a deceleration request torque, which has been predetermined based on a vehicle speed, is obtained at step S510, and then regenerative braking corresponding to the deceleration request torque is performed.

For reference, when the deceleration request torque is not greater than the maximum regenerative torque of a motor, that is, the maximum regenerative braking torque which can be realized by a motor, regenerative braking is performed using only a motor while releasing a clutch at step S520. Otherwise, the clutch is engaged, so that the regenerative braking force of a motor is added to the friction of an engine, thereby performing control such that the deceleration request torque is satisfied at step S530.

Meanwhile, with regard to the portions of FIG. 1 which have not been described, when the value of the accelerator pedal sensor is greater than 0, the maximum drive request torque, which has been previously mapped to the input-shaft rotational speed of transmission, is multiplied by the degree of the operation of the accelerator pedal sensor at step S540, thereby obtaining a drive torque to be output to the drive shaft of a vehicle. Further, the drive torque is generated using both the engine and the motor at step S550, thereby accelerating the vehicle.

Here, a situation where regenerative braking corresponding to a deceleration request torque is performed using a motor will be described. It can be seen that, when a driver takes his/her foot off an accelerator pedal, regenerative braking corresponding to a deceleration request torque, which has been preset, takes place according to a vehicle speed at that moment. In this case, even when the driver wants to increase the coasting distance of a vehicle by decreasing the amount of deceleration of the vehicle, this intention of the driver cannot be realized.

Therefore, if a vehicle speed decreases and the coasting distance is short due to an undesired level of regenerative braking when a driver takes his/her foot off an accelerator pedal, the driver typically steps on the accelerator pedal again in order to gain speed, thereby accompanying the frequent connection and disconnection of the clutch. Therefore, driving quality decreases because of the impact caused by the connection/disconnection, fuel efficiency is negatively affected, and the durability of the clutch decreases.

The contents, described as related art, are only intended to provide an understanding of the background of the present invention, and should not be understood that the present invention corresponds to already-known related art by those skilled in the art.

SUMMARY OF THE INVENTION

Accordingly, the present invention has been made keeping in mind the above problems occurring in the prior art, and an object of the present invention is to provide a system and method for controlling coasting of a hybrid vehicle equipped with an AMT, which, even when information about the degree of manipulation of a brake pedal cannot be obtained as in the case of a large-sized commercial vehicle, incorporates intentional coasting initiated by a driver based on the operational status of an accelerator pedal. The control can be performed in such a way that the amount of regenerative braking of a vehicle is appropriately varied. Thus, the level of coasting properties requested by a driver can be obtained, thereby preventing driving quality and durability from decreasing because a clutch is frequently operated.

In order to accomplish the above object, the present invention provides a system and method for controlling coasting of a hybrid vehicle equipped with an Automated Manual Transmission (AMT), including varying, by a controller, an amount of regenerative braking based on a degree of manipulation of an accelerator pedal within the predetermined control range of the total degree of manipulation of the accelerator pedal from when the accelerator pedal is not being manipulated; and decreasing, by the controller, the amount of regenerative braking as the degree of manipulation of the accelerator pedal increases.

Further, a method for controlling coasting of a hybrid vehicle equipped with AMT according to the present invention, includes determining whether the degree of manipulation of an accelerator pedal falls within a predetermined control range when a vehicle speed is 0. If the degree of manipulation of the accelerator pedal falls within the control range, a deceleration request conversion index is calculated corresponding to the current degree of manipulation of the accelerator pedal based on a conversion map including the deceleration request conversion index of the degree of manipulation of the accelerator pedal within the control range. Next a converted-deceleration request torque is calculated using a percentage by multiplying a deceleration request torque determined according to a vehicle speed by the calculated deceleration request conversion index. Regenerative braking is then performed based on the calculated converted deceleration request torque.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the embodiment of the present invention will be described in detail with reference to the attached drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, plug-in hybrid electric vehicles, hydrogen-powered hybrid vehicles and any other vehicle which requires the use of regenerative braking in order to operate. As referred to herein, a hybrid vehicle is a vehicle that has two or more sources of power, for example both gasoline-powered and electric-powered vehicles.

Figure 1:
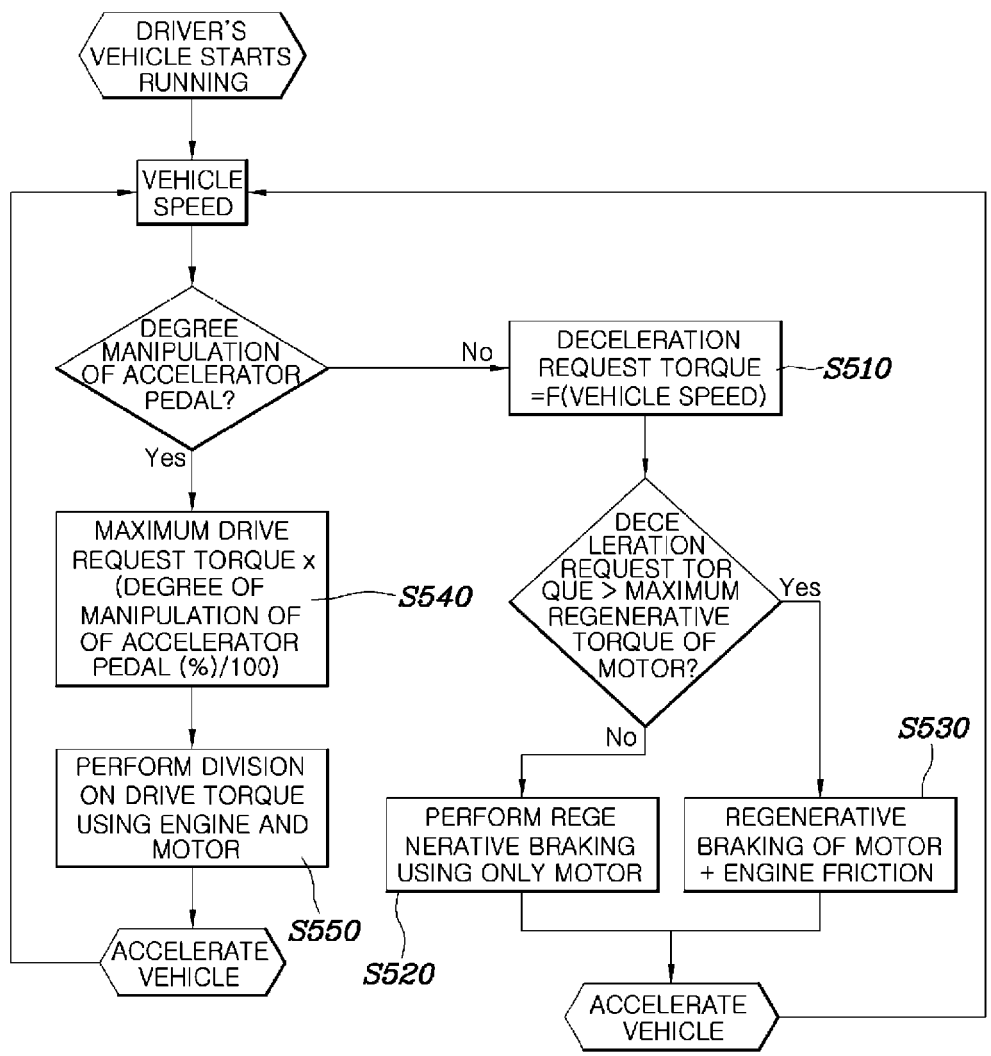
FIG. 1 is a flowchart illustrating a conventional method for controlling coasting of a hybrid vehicle equipped with an AMT.
Figure 2:
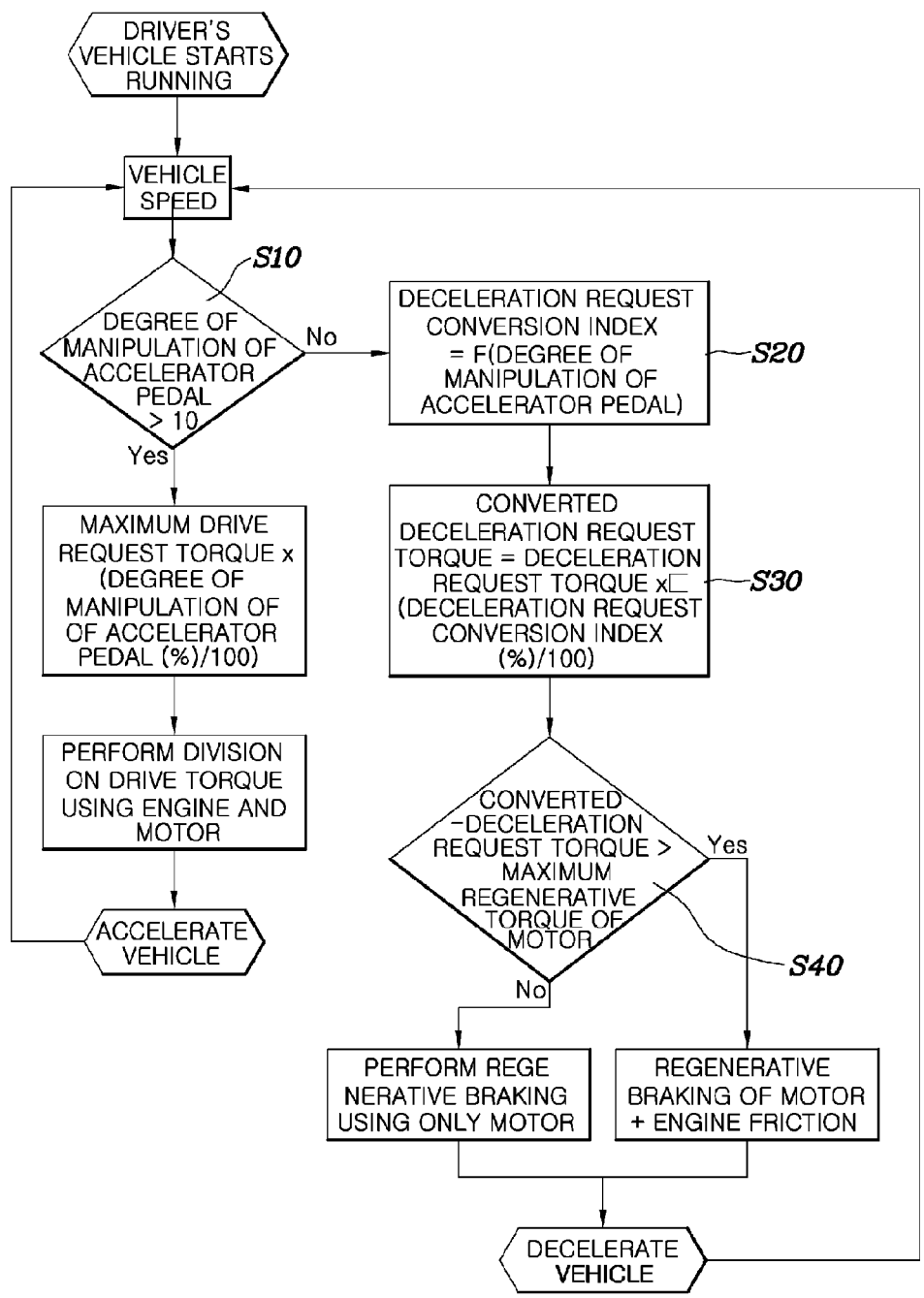
FIG. 2 is a flowchart illustrating a method for controlling coasting of a hybrid vehicle equipped with an AMT according to an exemplary embodiment of the present invention.

Referring to FIG. 2, a method for controlling coasting of a hybrid vehicle equipped with an automated manual transmission (AMT) according to an embodiment of the present invention includes a regenerative braking determination step S10 of determining whether the degree of manipulation of an accelerator pedal falls within a predetermined control range when a vehicle speed is 0; an index calculation step S20 of, if, as the result of the regenerative braking determination step S10, the degree of manipulation of the accelerator pedal falls within the control range, calculating a deceleration request conversion index corresponding to the current degree of manipulation of the accelerator pedal based on a conversion map including deceleration request conversion index of the degree of manipulation of the accelerator pedal within the control range; a deceleration request torque conversion step S30 of calculating a converted-deceleration request torque using a percentage by multiplying a deceleration request torque determined according to a vehicle speed by the deceleration request conversion index calculated at the index calculation step S20; and a regenerative braking step S40 of performing regenerative braking based on the converted deceleration request torque obtained at the deceleration request torque conversion step S30.

That is, the present invention performs control, via e.g., through a controller in communication with the power train system, in such a way as to vary the amount of regenerative braking based on the degree of manipulation of the accelerator pedal within the predetermined control range of a total degree of manipulation of the accelerator pedal from when an accelerator pedal is not being manipulated while decreasing the amount of regenerative braking as the degree of manipulation of the accelerator pedal increases. Therefore, if a driver manipulates the accelerator pedal within the control range, the manipulation is considered as intentional coasting by the driver, so that the amount of regenerative braking decreases within the control range to increase the coasting distance as the degree of manipulation of the accelerator pedal increases, thereby actively reflecting the coasting intention of the driver.

It is preferable that the predetermined control range, used to perform control in such a way as to vary the amount of regenerative braking according to the degree of manipulation of the accelerator pedal, be set to within the range of initial 5 to 20% of the total degree of manipulation of the accelerator pedal. If the control range is too wide, that is, greater than 20%, there may be a problem of lowering vehicle acceleration response made by the manipulation of the accelerator pedal. If the control range is too narrow, that is, lower than 5%, the variation in the amount of regenerative braking is too sensitive and rapid according to the variation in the degree of manipulation of the accelerator pedal, so that there may be a problem in that it is difficult to secure the appropriate operation. For reference, in this illustrative embodiment, the control range is set to 10% of a total degree of manipulation of the accelerator pedal from when the accelerator pedal is not being manipulated.

Figure 3:
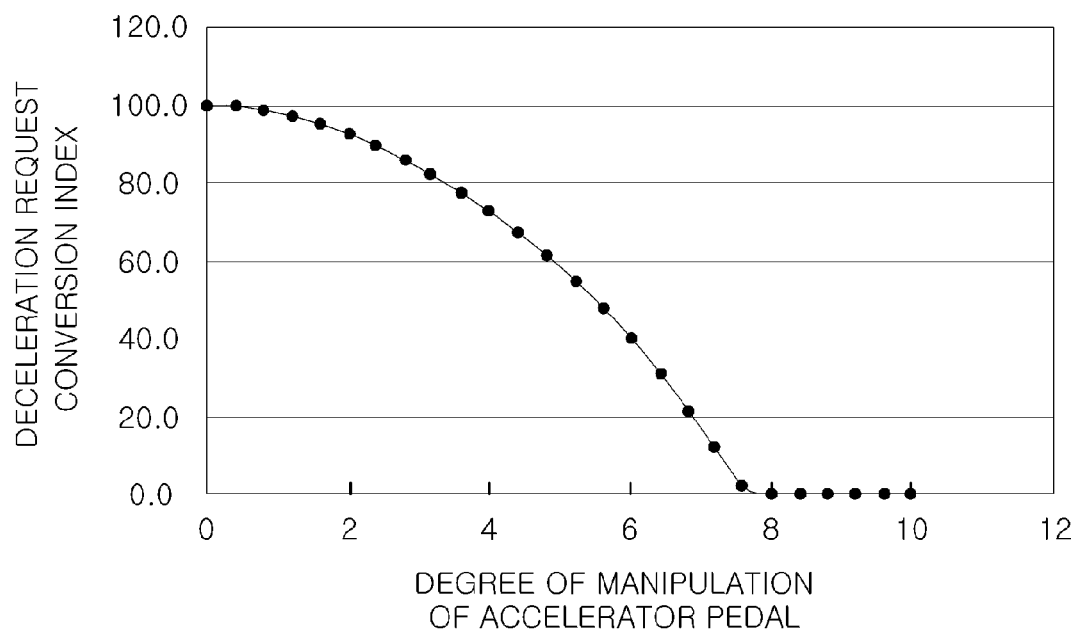
FIG. 3 is a graph illustrating a map, including a deceleration request conversion index of the degree of manipulation of an acceleration pedal, which is used to calculate index of the present invention.

The conversion map, including the deceleration request conversion index of the degree of manipulation of the accelerator pedal, is configured to have a maximum value when the degree of manipulation of the accelerator pedal is 0, and configured to have a minimum value when the degree of manipulation of the accelerator pedal is the maximum value of the control range, as shown in FIG. 3. That is, when a driver does not step on an accelerator pedal and the degree of manipulation of the accelerator pedal is 0, a deceleration request conversion index is 100. As the degree of manipulation of the accelerator pedal increases, the deceleration request conversion index decreases, and the deceleration request conversion index is mapped to 0 in the vicinity of 10% (about 8% to 10% in the embodiment) which is the maximum value of the control range of 10%.

Therefore, when the vehicle's speed is greater than 0, a vehicle is running and the degree of manipulation of the accelerator pedal is 0, the degree of manipulation of the accelerator pedal is included in the control range and the deceleration request conversion index corresponds to 100. Therefore, the converted deceleration request torque is calculated in such a way that the deceleration request conversion index 100 is multiplied by the deceleration request torque, determined based on a vehicle speed, using a percentage. The expression used to perform this calculation is

[converted deceleration request torque=deceleration request torque*(100/100)].     Eq. 1

The deceleration request torque, determined based on a vehicle speed, is calculated as the converted deceleration request torque without change, and regenerative braking is performed based on the calculated deceleration request torque, so that regenerative braking is realized in the state which is the same as previous regenerative braking.

Meanwhile, when the vehicle speed is greater than 0, a vehicle is running and the degree of manipulation of the accelerator pedal is 10%, the degree of manipulation of the accelerator pedal corresponds to the maximum value of the control range and the deceleration request conversion index corresponds to 0. When the converted deceleration request torque is calculated so that the deceleration request conversion index 0 is multiplied by the deceleration request torque, determined based on the vehicle speed, using a percentage, the expression used to perform this calculation is:

$$[\text{converted deceleration request torque} = \text{deceleration request torque} * (0/100)] \quad \text{Eq. 2}$$

Thus, the converted deceleration request torque is 0. In the end, regenerative braking is not performed in this case, so that the maximum coasting distance is guaranteed.

The remaining parts of FIG. 2 operate in the same manner as those of the above-described conventional method, and therefore the detailed description thereof is omitted.

According to the present invention described above, control is made such that the amount of regenerative braking is gradually decreased in a predetermined range based on the degree of manipulation of the accelerator pedal depressed by a driver, so that the coasting intention of the driver is received based on the manipulation of the accelerator pedal and a vehicle coasting distance increases. Therefore, it is possible to avoid frequent accelerator pedal manipulation performed by the driver due to excessive regenerative braking in which the driver's intention to coast is ignored, so that the occurrence of impact is prevented by eliminating frequent clutch operation, thereby improving driving quality, improving the durability of a clutch, and contributing to fuel efficiency due to increased coasting distances.

According to the present invention, even when information about the degree of manipulation of a brake pedal cannot be obtained as in the case of a large-sized commercial vehicle, the driver's intention to coast is realized based on the operational status of an accelerator pedal. Therefore, control can be performed in such a way that the amount of regenerative braking of a vehicle is appropriately varied, so that the level of coasting properties requested by a driver can be obtained, thereby preventing driving quality and durability from decreasing because a clutch is frequently operated.

Furthermore, the control of the system of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling coasting of a hybrid vehicle equipped with an Automated Manual Transmission (AMT), comprising:
   varying, by a controller, an amount of regenerative braking based on a degree of manipulation of an accelerator pedal within a predetermined control range of a total degree of manipulation of the accelerator pedal from when the accelerator pedal is not being manipulated; and
   decreasing, by the controller, the amount of regenerative braking as the degree of manipulation of the accelerator pedal increases.

2. The method as set forth in claim 1, wherein the control range, used to vary the amount of regenerative braking according to the amount of manipulation of the accelerator pedal, is set to within a range of initial 5 to 20% of the total degree of manipulation of the accelerator pedal.

3. The method as set forth in claim 2, further comprising:
   when the degree of manipulation of the accelerator pedal falls within the control range, calculating a deceleration request conversion index, corresponding to a current amount of manipulation of the accelerator pedal based on a conversion map including the deceleration request conversion index of the degree of manipulation of the accelerator pedal, within the control range;
   calculating a converted-deceleration request torque using a percentage by multiplying a deceleration request torque determined according to a vehicle speed by a relevant deceleration request conversion index; and
   performing a regenerative braking function such that the converted deceleration request torque is satisfied.

4. The method as set forth in claim 3, wherein the conversion map, including the deceleration request conversion index of the degree of manipulation of the accelerator pedal, is configured to have a maximum value when the degree of manipulation of the accelerator pedal is 0, and configured to have a minimum value when the degree of manipulation of the accelerator pedal is a maximum value of the control range.

5. A method for controlling coasting of a hybrid vehicle equipped with AMT, comprising:
   determining whether a degree of manipulation of an accelerator pedal falls within a predetermined control range when a vehicle speed is 0;
   in response to determining that the degree of manipulation of the accelerator pedal falls within the control range, calculating a deceleration request conversion index corresponding to a current degree of manipulation of the accelerator pedal based on a conversion map including a deceleration request conversion index of the degree of manipulation of the accelerator pedal within the control range;
   calculating a converted-deceleration request torque using a percentage by multiplying a deceleration request torque determined according to a vehicle speed by the calculated deceleration request conversion index; and
   performing regenerative braking based on the calculated converted deceleration request torque.

6. The method as set forth in claim 5, wherein the predetermined control range is set to within a range of initial 5 to 20% of a total degree of manipulation of the accelerator pedal.

7. The method as set forth in claim 5, wherein the conversion map, including the deceleration request conversion index of the degree of manipulation of the accelerator pedal, is configured to have a maximum value when the degree of manipulation of the accelerator pedal is 0, and configured to have a minimum value when the degree of manipulation of the accelerator pedal is a maximum value of the control range.

* * * * *